United States Patent [19]

Pace et al.

[11] Patent Number: 5,028,861
[45] Date of Patent: Jul. 2, 1991

[54] STROBED DC-DC CONVERTER WITH CURRENT REGULATION

[75] Inventors: Gary L. Pace; David H. Overton, both of Boca Raton, Fla.

[73] Assignee: Motorola, Inc., Schaumburg, Ill.

[21] Appl. No.: 356,089

[22] Filed: May 24, 1989

[51] Int. Cl.⁵ .............................................. G05F 1/575
[52] U.S. Cl. ..................... 323/222; 323/225; 323/284; 323/285; 323/223
[58] Field of Search ............... 323/222, 225, 271, 272, 323/282, 284, 285, 223

[56] References Cited

U.S. PATENT DOCUMENTS

| | | | |
|---|---|---|---|
| 2,977,524 | 3/1961 | Lingle | 315/241 P |
| 3,012,181 | 12/1961 | Schultz | 315/241 P |
| 3,127,551 | 3/1964 | Lingle | 315/241 P |
| 3,213,344 | 10/1965 | Jensen | 315/241 P |
| 3,316,445 | 4/1967 | Ahrons | 315/241 P |
| 3,863,128 | 1/1975 | Wilwerding | 315/241 P |
| 3,931,566 | 1/1976 | Pask et al. | 323/285 |
| 4,068,151 | 1/1978 | Harrison | 315/241 P |
| 4,071,884 | 1/1978 | Maigret | 315/241 P |
| 4,355,277 | 10/1982 | Davis et al. | 323/351 |
| 4,392,103 | 7/1983 | O'Sullivan et al. | 323/284 |
| 4,610,521 | 9/1986 | Inoue | 315/241 P |
| 4,634,956 | 1/1987 | Davis et al. | 323/222 |
| 4,678,983 | 7/1987 | Rouzies | 323/222 |
| 4,695,785 | 9/1987 | Mieth et al. | 323/285 |
| 4,712,169 | 12/1987 | Albach | 323/282 |
| 4,717,867 | 1/1988 | Forehand | 323/223 |
| 4,837,495 | 6/1989 | Zansky | 323/222 |

OTHER PUBLICATIONS

Gracie; "Intermittent Converter Saves Power"; EDN; Sep. 1, 1989; p. 151.

Primary Examiner—Steven L. Stephan
Assistant Examiner—Jeffrey Sterrett
Attorney, Agent, or Firm—Gregg Rasor; William E. Koch; Vincent B. Ingrassia

[57] ABSTRACT

A DC-DC converter regulates the maximum current through an inductor. The DC-DC converter operates within a paging receiver and boosts a voltage from a single cell battery to substantially 3.1 VDC in order to operate circuits which require more voltage than that produced by the single cell battery. Such circuits include CMOS microcomputers and code plug. The DC-DC converter is current regulated thus providing for improved power conversion efficiency. The DC-DC converter is active when the voltage is below a minimum voltage and inactive when above a maximum voltage. The DC-DC converter provides for a wide range of load currents from the converted voltage without being controlled by a microcomputer and while delivering the power to the loads with an improved efficiency.

14 Claims, 2 Drawing Sheets 5,028,861

STROBED DC-DC CONVERTER WITH CURRENT REGULATION

BACKGROUND OF THE INVENTION

This invention relates in general to the field of DC-DC converters. In particular, this invention relates to boost mode DC-DC converters operating within portable receivers.

Portable receivers such as pagers operate from a single cell battery. The pagers may be controlled by a microcomputer which requires more operating voltage than is available from the single cell battery. Consequently, a DC-DC converter is used to boost the battery voltage to a converted voltage high enough to operate the microcomputer. In place of, or in addition to the microcomputer, the boosted voltage may supply power to other circuits.

In portable battery operated products, such as pagers, it is desirable to have the lowest possible current drain in order to maximize battery life. Since the bias circuits of DC-DC converters consume current, it is desirable to switch the bias circuits off when power conversion is not required. In the past, DC-DC converters have been switched off with a predetermined duty cycle and a predetermined period. Such a method is shown in U.S. Pat. No. 4,634,956 to Davis et. al.

The DC-DC converter described in said patent, periodically switched an inductor to ground using an NPN switching transistor, and in releasing the inductor, developed a voltage potential across the inductor. When the voltage exceeded a predetermined voltage, a rectifying diode transferred the energy in the inductor to a storage capacitor to develop a converted voltage potential. Using a closed loop feedback system, the duty cycle of the periodic switching to ground of the inductor was adjusted to maintain a regulated voltage. However, when the converted voltage was substantially below the regulated voltage, a predetermined maximum duty cycle was selected for operation under worst case conditions. As a result of the predetermined maximum duty cycle, the current through the inductor builds to a large value This large value caused the inductor to saturate, the NPN switching transistor to be driven out of saturation, and excessive current to be delivered through the rectifying diode. This reduced the conversion efficiency of the DC-DC converter.

When the DC-DC converter was switched off for a predetermined time, circuits were powered by the energy stored within a capacitor coupled to the converted voltage. The capacitor was allowed to discharge during the predetermined time when the DC-DC converter was switched off. Then when the DC-DC converter was switched back on for a second predetermined time, the capacitor was recharged. During the recharge process, the DC-DC converter operated at the aforementioned maximum duty cycle, thereby decreasing the efficiency of the conversion process.

Additionally, the DC-DC converter was powered off and on with a fixed period and for a fixed "on" duration with a signal generated by a microcomputer based pager decoder. The period and "on" duration were selected to insure that the converted voltage does not decay excessively during the off interval under worst case load and circuit parameter conditions. As a result, under typical conditions the "on" duration was excessive which further degraded efficiency. Additionally, the microcomputer had to remain in a relatively high power operating state in order to power off and on at the fixed period.

Thus, although said patent described a method for the substantial reduction of current within a paging receiver when operating in a reduced power mode, the conversion efficiency of the DC-DC converter degraded, and the microcomputer operated in a relatively high power operating state in order to provide for the substantial current reduction.

Additionally, the DC-DC converter of the aforementioned patent had three operating modes, the first being a low current mode wherein the DC-DC converter powers off and on, which was typically used while the pager operated in a battery saving mode. The second being a medium current load, which was typically used while receiving and processing data. And the third being a high current load, which was typically used while the pager was reading the code plug. The second and third modes are described in U.S. Pat. No. 4,355,277 to Davis et al. The microcomputer issued commands which operated the DC-DC converter in each of these three modes, which was an additional burden for the microcomputer.

SUMMARY OF THE INVENTION

It is therefore an object of this invention to resolve the aforementioned problems.

It is an object of the invention to power a DC-DC converter off and on without the aid of a microcomputer.

It is an object of the present invention to provide a means of powering a DC-DC converter off and on at an optimal period and duty cycle.

It is an object of the present invention to provide a DC-DC converter which has improved conversion efficiency.

It is an object of the present invention to provide a DC-DC converter capable of supplying power at the various load requirements of a paging decoder without the aid of a microcomputer.

In accordance with the present invention, a DC-DC converter comprises a means for converting a first DC voltage to a converted DC voltage with a regulated maximum current, and a power conservation means for powering on said converting means in response to the converted DC voltage being less than a minimum voltage, and for powering off said converting means in response to the converted DC voltage being greater than a maximum voltage.

In accordance with the present invention, a DC-DC converter comprises a switching means for increasing the current flow through an inductor, a current sensing means for sensing the current flow through said switching means, and a regulating means governed by said current sensing means to deactivate said switching means in response to the current flow through the inductor exceeding a predetermined value, thereby decreasing the current flow through the inductor.

DESCRIPTION OF A PREFERRED EMBODIMENT

Figure 1:
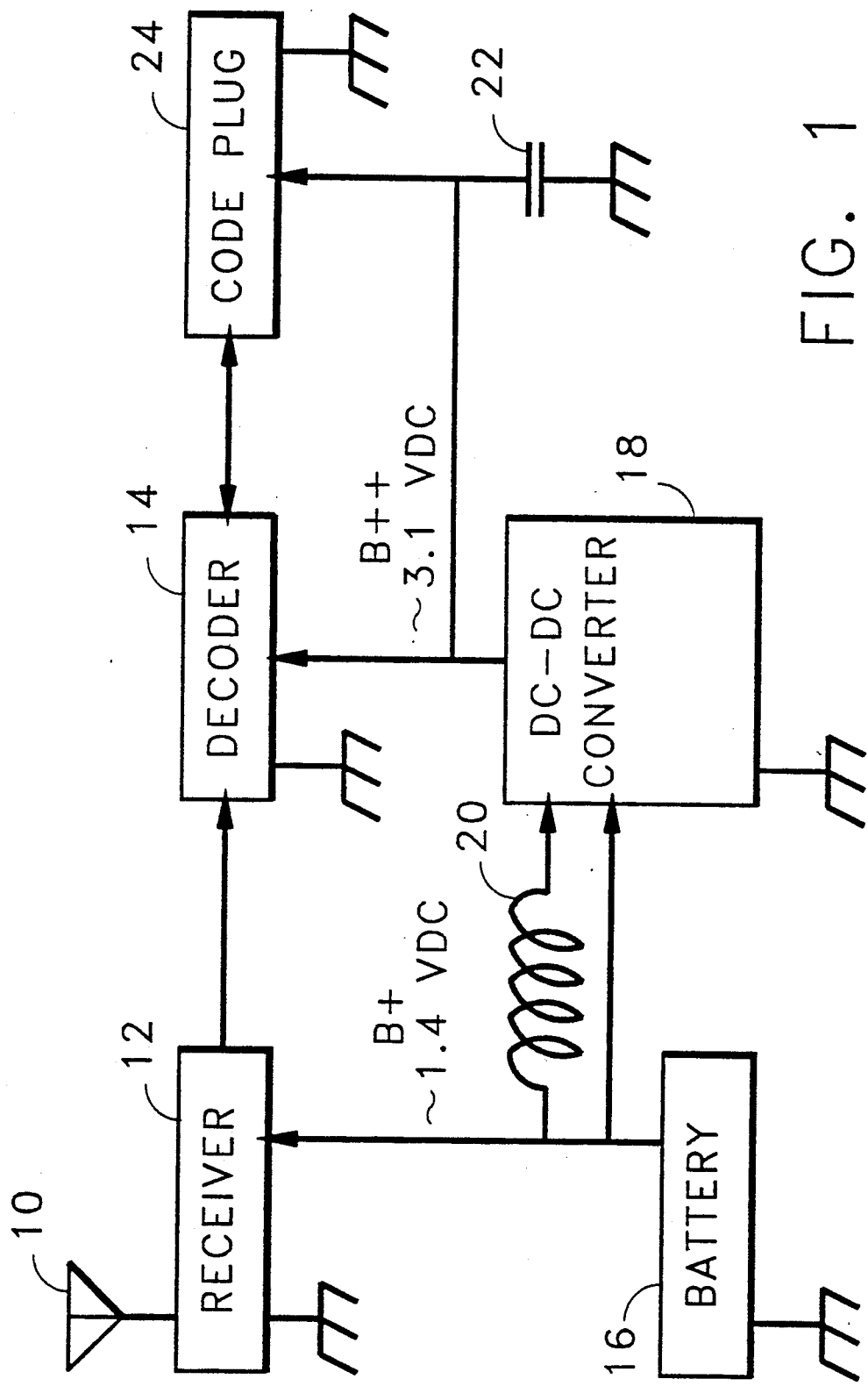
FIG. 1 shows a block diagram of a pager operating in accordance with the present invention.

FIG. 1 shows a block diagram of a pager operating in accordance with the present invention. Paging signals are received by antennas 10 and demodulated by receiver 12. The paging signals are then decoded by decoder 14. The receiver is powered by a single cell battery 16 which generates a "B+" voltage of typically 1.4V. The decoder is powered by a "B++" voltage which is substantially 3.1V. The B++ voltage is generated by a DC-DC converter 18 which boosts the B+ voltage by switching inductor 20. The B++ voltage is stored on capacitor 22. The B++ voltage also supplies power for the code plug 24.

Receiving and decoding paging signals is well known in the art. The paging signals may be received on any of a plurality of paging protocols such as the GSC, POCSAG, or 5 tone sequential protocols. In response to the reception of the paging signals, the receiver is periodically activated. Additionally, the decoder operates in a low power mode while the receiver is inactive and operates in a high power mode while the receiver is active. The decoder searches the paging signal for an address which matches an address stored in the code plug. The code plug is powered on in order to read the address, and powered off otherwise. In response to detecting the address, an alert is generated.

Consequently, it can be appreciated that the power consumption from B++ may vary dramatically. The decoder periodically enters high and low current modes, wherein the decoder low current mode may be one twentieth of the current of the decoder high current mode. The code plug is periodically activated, and while activated may consume more than twice the current of decoder high current mode. The prior art DC-DC converters required the decoder to control the DC-DC converter in order to operate over all of the current loads. The DC-DC converter of the present invention however, provides for all of these loading conditions without the microcomputer control, and the efficiency of the conversion process is improved.

Figure 2:
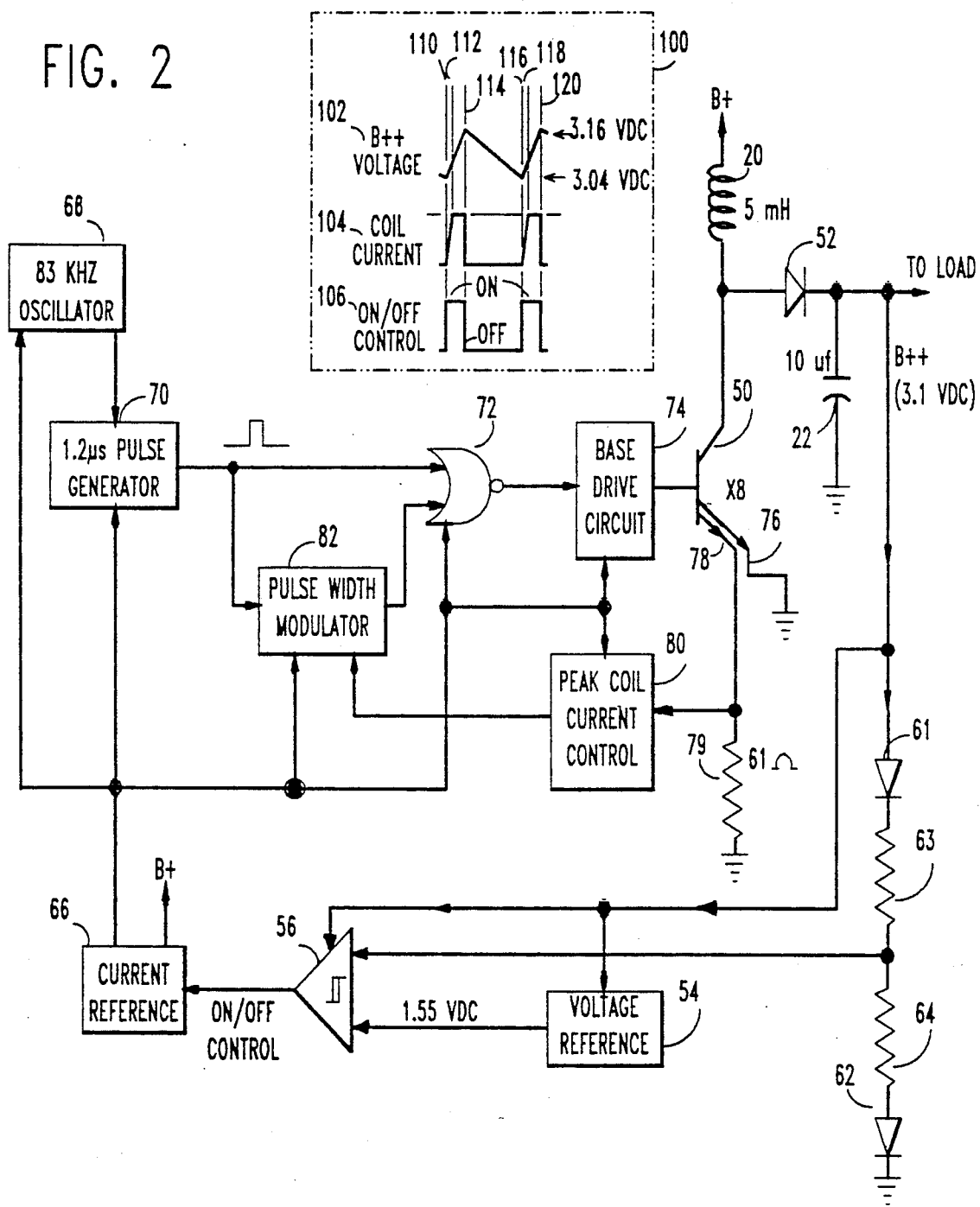
FIG. 2 shows a block diagram of the DC-DC converter operating in accordance with the present invention.

FIG. 2 shows a block diagram of the DC-DC converter operating in accordance with the present invention. Battery voltage, B+, is coupled to an input to inductor 20. The output of the inductor is periodically coupled to the common potential of ground through switching transistor 50. While coupled to ground, the current in the inductor builds to a predetermined level, or the inductor is grounded for a predetermined time, in response to either transistor 50 is switched off. Switching the transistor off causes the voltage across the inductor to rise until it substantially equals the voltage on capacitor 22, in response to which diode 52 conducts causing the inductor to deliver energy to the capacitor. Transistor 50 may be switched on and off substantially 83,000 times per second providing for a continuous supply of converted energy. Thus, energy at a boosted voltage is supplied to the capacitor which in turn provides B++ voltage to other circuits such as decoder 14, and code plug 24 of FIG. 1. Inductor 20 is preferably a 5 mH inductor, capacitor 22 is preferably a 10 µF capacitor and diode 52 is preferably a Schottky diode.

B++ voltage is regulated using a voltage sensing means which enables the energy conversion process in response to the B++ voltage being less than a first predetermined voltage and disables the energy conversion process in response to the B++ voltage being greater than a second predetermined voltage. Since circuits which provide for the energy conversion process draw power when enabled, disabling the circuits which provide for the energy conversion process also conserves power. Referring to FIG. 2, B++ voltage is used to power a voltage reference 54 which produces a regulated 1.55V. B++ also powers a comparator 56 having effectively 120 mV of hysteresis with respect to B++. One input to the comparator is coupled to the 1.55V signal and the other input is coupled to a voltage derived from B++ voltage, which is divided by diodes 61 and 62 and resistors 63 and 64. The comparator, voltage reference, and voltage divider operate such that the output of the comparator generates an ON signal in response to B++ being less than 3.04V and generates an OFF signal in response to B++ being greater than 3.16V.

The output of the comparator is coupled to current reference 66 which derives power from B+ and powers the circuits which provide for the energy conversion process. These circuits which provide for the energy conversion process include: 83 kHz oscillator 68, 1.2 µS pulse generator 70, NOR gate 72, base drive circuit 74, peak inductor current control 80, and pulse width modulator 82. The 83 kHz oscillator provides a clocking frequency which eventually switches transistor 50 ON substantially 83,000 time per second. The 1.2 uS pulse generator provides for a maximum ON duty cycle of transistor 50 of substantially 90%. The output of the 1.2 uS pulse generator travels through NOR gate 72 and through base drive circuit 74 which causes the transistor 50 to switch ON and OFF.

At the maximum duty cycle, the current through the conversion devices; inductor 20, transistor 50, and diode 52, would build to a very high level. As previously detailed this reduces the efficiency of the energy conversion process. The invention provides a means for regulating this current to a maximum thereby improving the efficiency. The regulating means itself dissipates very little power, thereby only marginally impacting the efficiency of the energy conversion process.

The current through the conversion devices is regulated by reducing the duty cycle of the switching transistor when the current reaches a predetermined level, thereby regulating the current. The current through the conversion devices is sensed by sensing the current through switching transistor 50. Switching transistor 50 is a multiple emitter NPN transistor wherein the emitters have a predetermined ratio established by the geometry of the transistor. The first emitter 76 is coupled directly to the common potential while the second emitter is coupled to the common potential through a sensing resistor 79. A substantially greater current flows through emitter 76 than through emitter 78. Thus the voltage developed across resistor 79 is a function of the current through the conversion devices. Since the majority of the current flows through emitter 76, very little power is dissipated in resistor 79, thereby only marginally impacting the efficiency of the energy conversion process.

In the preferred embodiment, the ratio between the emitters is 8:1. In the preferred embodiment resistor 79 is 61µ and voltage across the resistor typically does not exceed 18 mV while transistor 50 activated. Since the current is regulated to typically deliver 1 mA at 3.1V, thus 3.1 mW, it can be appreciated that the powered dissipated in resistor 79 is relatively small.

The voltage across resistor 79 is monitored by the peak current control 80 which includes a controlled gain amplifier and voltage reference in the preferred embodiment. When transistor 50 is switched on, the voltage across the resistor increases as the current through the inductor increases. When the voltage reaches a predetermined level, 18 mV in the preferred embodiment, the peak current control generates a peak signal which is delivered to pulse width modulator 82. Pulse width modulator 82 in conjunction with NOR gate 72 operate to deliver the maximum duty cycle in the absence of the peak signal, thereby allowing the current to build up with each cycle, and to reduce the duty cycle in response to the generation of the peak signal. The reducing of the duty cycle in response to the generation of the peak signal with each cycle of the 83 kHz has the effect of regulating the maximum current through the switching devices. Thus elements 20, 22, 50, 52, 66, 68, 70, 72, 74, 79, 80, and 82 form a means for converting a first DC voltage, B+, to a converted DC voltage, B++. Of these, elements 78, 9, 80 and 82 form a means for regulating the maximum current through the converting devices. Devices 54-64 provides a power conservation means for powering on the converting means via current reference 66 in response to B++ being less than a minimum voltage of substantially 3.04V and for powering off the converting means, via current source 66, in response to B++ being greater than 3.16V.

Graph 100 shows the typical operation of the invention. Waveform 102 shows the B++ voltage variations averaged over many cycles of 83 kHz, waveform 104 shows the current through the inductor averaged over many cycles of 3 kHz and waveform 106 shows the ON/OFF control signal. At point 110, B++ is less than 3.04V, in response to which the ON signal is generated. The converting means is powered on and the switching means is driven with a maximum duty cycle. The inductor current builds to a predetermined value substantially equal to 5 mA, point 112, in response to which the current is regulated. The energy conversion from point 110 causes B++ to increase to 3.16V at point 114, in response to which the OFF signal is generated and the converting means is powered off. After interval 114, the load devices on B++ are powered by energy stored on the capacitor 22. This causes B++ to decay until it reaches a voltage less than 3.04V at point 116 wherein step 116, 118 and 120 duplicate steps 110, 112, and 114 respectively. Thus the DC-DC converter of the present invention operates between 3.04V and 3.16V resulting in a nominal converted voltage of 3.1V. This nominal voltage will be maintained over the variations of the battery voltage which may be between 3.2V and 0.8V depending upon the battery technology i.e. lithium, NiCd, Alkaline etc., and discharge condition of the battery.

When the pager is operating in the low current mode, the decay time between points 114 and 116 will be long in time because the load on capacitor 22 is small. While receiving data, the decay time between points 114 and 116 will decrease because the decoder is consuming more power in order to process the data. The energy conversion rate is chosen to adequately supply power in the high current mode. The conversion process is improved because during points 110-114, this invention provides for an energy conversion process which has a high efficiency. Additional energy is conserved because the period and "on" duration are automatically adjusted in response to changes in load conditions, variation in B+ voltage and variation in storage capacitor 20. The resultant "on"0 duration will be automatically minimized, the period maximized, and the efficiency maximized. Since the invention provides a means for efficiently converting power over a wide range of load conditions, a microcomputer no longer need control the power converting means. Thus the microcomputer is relieved of a burden and executes less instructions while in the low current mode, thus even further reducing the power consumed in the low current mode.

It should be appreciated that with the exception of devices 20 and 22, the circuit of FIG. 2 may be entirely integrated onto a single integrated circuit. In the preferred embodiment, the circuits are integrated using bipolar technology, well known to those familiar with the art.

It will be appreciated that the invention has been described above by way of example and that modifications to the above may be made without departing from the spirit and scope of the invention. For example emitter 76 can be eliminated and the advantages of this invention still realized.

What is claimed is:

1. A DC-DC converter comprising:
converting means for converting a first DC voltage to a converted DC voltage; and
power conservation means having hysteresis for powering on said converting means in response to the converted DC voltage being less than a minimum voltage, and for powering off said converting means in response to the converted DC voltage being greater than a maximum voltage, said converting means comprising:
switching means for increasing the current flow through an inductor;
current sensing means for sensing the current flow through the inductor;
regulating means governed by said current sensing means to control said switching means in response to the current flow through the inductor exceeding a predetermined value, thereby regulating the current flow through the inductor;
voltage storage means for storing the converted DC voltage;
rectifying means having an input coupled to said switching means and an output coupled to said voltage storage means; and
timing means for periodically activating said switching means, wherein the inductor has an input coupled to a voltage source and an output coupled to said switching means and said rectifying means, and wherein the switching means couples the output of the inductor to a common potential when activated, and decouple the output of the inductor from the common potential when deactivated.

2. The DC-DC converter system of claim 1 wherein said DC-DC converting means further comprises means for regulating a maximum current of said converted DC voltage.

3. The DC-DC converter system of claim 2 further comprising a means for establishing a maximum duty cycle, wherein said switching means is deactivated after being activated for a predetermined time in the event that said regulating means does not activate switching means prior to the predetermined time.

4. The DC-DC converter system of claim 2 wherein said switching means includes a saturating NPN transistor having first and second emitters, the first emitter coupled to a common potential and wherein said current sensing means includes the second emitter of the NPN transistor and a resistor coupled between the second emitter and the common potential wherein the voltage across the resistor increases as the current through the inductor increases.

5. The DC-DC converter system of claim 2 wherein said switching means includes a saturating NPN transistor having an emitter wherein said current sensing means includes a resistor coupled between the emitter and a common potential wherein the voltage across the resistor increases as the current through the inductor increases.

6. The DC-DC converter system of claim 1 wherein the minimum voltage corresponds to three thousand and forty millivolts and the maximum voltage corresponds to three thousand one hundred and sixty millivolts.

7. A DC-DC converter comprising:
  converting means for converting a first DC voltage to a converted DC voltage, comprising:
    switching means for increasing the current flow through an inductor;
    current sensing means for sensing the current flow through said switching means; and
    regulating means governed by said current sensing means to control said switching means in response to the current flow through said switching means exceeding a predetermined value, thereby regulating the current flow through the inductor; and
  power conservation means having hysteresis for powering on said converting means in response to the converted DC voltage being less than a minimum voltage, and for powering off said converting means in response to the converted DC voltage being greater than a maximum voltage.

8. The DC-DC converter of claim 7 wherein said switching means includes a saturating NPN transistor having an emitter wherein said current sensing means includes a resistor coupled between the emitter and a common potential wherein the voltage across the resistor increases as the current through the inductor increases.

9. The DC-DC converter of claim 7 wherein said switching means includes a saturating NPN transistor having first and second emitters, the first emitter coupled to a common potential and wherein said current sensing means includes the second emitter of the NPN transistor and a resistor coupled between the second emitter and the common potential wherein the voltage across the resistor increases as the current through said switching means increases.

10. The DC-DC converter of claim 7 further comprises a timing means for periodically activating said switching means.

11. The DC-DC converter of claim 10 further comprising a means for establishing a maximum duty cycle, wherein said switching means is deactivated after being activated for a predetermined time in the event that said regulating means does not activate switching means prior to the predetermined time.

12. The DC-DC converter of claim 10 wherein the inductor has an input coupled to a source voltage and an output coupled to said switching means, and wherein the switching means couples the output of the inductor to a common potential when activated, and decouples the output of the inductor from the common potential when deactivated 13. The DC-DC converter of claim 12 further comprising:
  voltage storage means for storing a converted DC voltage;
  rectifying means having an input coupled to the output of the inductor and an output coupled to said voltage storage means;
  regulating means responsive to the converted DC voltage for enabling said timing means in response to the converted DC voltage being less than a predetermined voltage and for disabling said timing means in response to the converted DC voltage being greater than a second predetermined voltage greater than the first predetermined voltage.

14. The DC-DC converter of claim 13 wherein the converted DC voltage is greater than the source voltage.

* * * * *